(12) United States Patent  
de Ruijter et al.

(10) Patent No.: US 10,172,105 B2  
(45) Date of Patent: Jan. 1, 2019

(54) APPARATUS FOR RECEIVER WITH MULTI-BIT OBSERVATION INTERVAL AND ASSOCIATED METHODS

(71) Applicant: Silicon Laboratories Inc., Austin, TX (US)

(72) Inventors: Hendricus de Ruijter, Sunnyvale, CA (US); Ping Xiong, Sunnyvale, CA (US); Wentao Li, Mountain House, CA (US)

(73) Assignee: Silicon Laboratories Inc., Austin, TX (US)

( * ) Notice: Subject to any disclaimer, the term of this patent is extended or adjusted under 35 U.S.C. 154(b) by 29 days.

(21) Appl. No.: 15/164,363

(22) Filed: May 25, 2016

(65) Prior Publication Data

US 2016/0353398 A1    Dec. 1, 2016

Related U.S. Application Data

(63) Continuation-in-part of application No. 14/080,405, filed on Nov. 14, 2013, and a continuation-in-part of application No. 13/949,837, filed on Jul. 24, 2013, now Pat. No. 9,720,875.

(51) Int. Cl.
| | |
|---|---|
| *H04J 3/16* | (2006.01) |
| *H04W 4/70* | (2018.01) |
| *H04W 56/00* | (2009.01) |
| *H04L 12/26* | (2006.01) |
| *H04W 74/08* | (2009.01) |
| *H04L 27/22* | (2006.01) |

(52) U.S. Cl.  
CPC ............ *H04W 56/001* (2013.01); *H04L 27/22* (2013.01); *H04L 43/028* (2013.01); *H04W 4/70* (2018.02); *H04W 74/0833* (2013.01); *H04J 3/1605* (2013.01)

(58) Field of Classification Search  
None  
See application file for complete search history.

(56) References Cited

U.S. PATENT DOCUMENTS

| | | |
|---|---|---|
| 3,787,863 A | 1/1974 | Watanabe |
| 4,020,461 A | 4/1977 | Adams |
| 4,219,778 A | 8/1980 | Ishii |
| 4,458,206 A | 7/1984 | Dellande |
| 5,384,564 A | 1/1995 | Wycoff |
| 5,450,477 A | 9/1995 | Dutta |

(Continued)

OTHER PUBLICATIONS

U.S. Appl. No. 14/080,405, filed Nov. 2013, de Ruijter et al.

(Continued)

*Primary Examiner* — Brian S Roberts  
(74) *Attorney, Agent, or Firm* — Law Offices of Maximilian R. Peterson

(57) ABSTRACT

An apparatus includes a radio frequency (RF) receiver having a multi-bit observation interval. The RF receiver includes a Coordinate Rotation Digital Computer (Cordic) circuit to receive a complex signal derived from RF signals and to generate a phase signal. The RF receiver further includes a timing correlator and frequency offset estimator coupled to receive data derived from a frequency signal derived from the phase signal. The RF receiver in addition includes a Viterbi decoder coupled to provide decoded data derived from the frequency signal.

20 Claims, 9 Drawing Sheets

(56) References Cited

U.S. PATENT DOCUMENTS

| | | | |
|---|---|---|---|
| 5,946,292 | A | 8/1999 | Tsujishita |
| 6,389,270 | B1 | 5/2002 | Nohrden |
| 6,438,183 | B1 | 8/2002 | Taura |
| 6,516,028 | B1 | 2/2003 | Kobayashi |
| 7,212,798 | B1 | 5/2007 | Adams |
| 7,636,404 | B2 | 12/2009 | Guo |
| 8,295,404 | B1 * | 10/2012 | Husted ............... H04L 27/2071 375/329 |
| 8,711,718 | B2 | 4/2014 | Su |
| 2002/0145971 | A1 * | 10/2002 | Cho ............... H04L 25/0204 370/208 |
| 2005/0100105 | A1 | 5/2005 | Jensen |
| 2005/0249307 | A1 * | 11/2005 | Yu ............... H03D 3/004 375/272 |
| 2006/0270355 | A1 | 11/2006 | Mak |
| 2009/0046764 | A1 | 2/2009 | Manzi |
| 2009/0060104 | A1 | 3/2009 | Jones |
| 2009/0180524 | A1 | 7/2009 | Wang |
| 2010/0128817 | A1 | 5/2010 | Philips |
| 2012/0146834 | A1 | 6/2012 | Karr |
| 2012/0288040 | A1 * | 11/2012 | Yi ............... H04L 27/0014 375/343 |
| 2013/0022148 | A1 * | 1/2013 | Sagi ............... H04L 27/361 375/296 |
| 2013/0278914 | A1 | 10/2013 | Demarest |
| 2015/0030061 | A1 | 1/2015 | de Ruijter |
| 2016/0353398 | A1 | 12/2016 | de Ruijter |

OTHER PUBLICATIONS

U.S. Appl. No. 13/949,837, filed Jul. 2013, de Ruijter et al.
U.S. Appl. No. 15/168,080, de Ruijter et al.
U.S. Appl. No. 15/370,674, Xiong et al.
Iwanami et al., *Sequence Estimation Scheme Using Viterbi Algorithm for Improving Bit Error Rate of Binary Continuous Phase FSK with Limiter Discriminator and Integrate & Dump Filter Detection*, ICCS/ISITA 2002, 5 pgs.
Aulin et al., *Continuous Phase Modulation—Part II: Partial Response Signaling*, IEEE Transactions on Communications, vol. COM:29, No. 3, Mar. 1981, 16 pgs.
Proakis, Digital Communications, Fourth Edition, 289-295 (2001), 8 pgs.
U.S. Appl. No. 15/370,693, filed Dec. 2016, de Ruijter.
U.S. Appl. No. 15/472,609, filed Mar. 2017, Zhou.
Zhang et al., *Low-Effort High-Performance Viterbi-based Receiver for Bluetooth LE Applications*, 4 pgs.
Office communication in U.S. Appl. No. 15/168,080, dated Jul. 20, 2017, 10 pgs.
Office communication in U.S. Appl. No. 15/370,674, dated Jul. 28, 2017, 13 pgs.
Office communication in U.S. Appl. No. 15/168,080, dated Feb. 7, 2018, 18 pgs.
Office communication in U.S. Appl. No. 15/370,674, dated Feb. 22, 2017, 17 pgs.
Office communication in U.S. Appl. No. 15/370,674, dated Jun. 1, 2018, 14 pgs.
Office communication in U.S. Appl. No. 15/370,693, dated Jul. 28, 2017, 14 pgs.
Office communication in U.S. Appl. No. 15/370,693, dated Feb. 14, 2018, 17 pgs.
Office communication in U.S. Appl. No. 15/370,693, dated Jun. 1, 2018, 16 pgs.
Freescale Semiconductor, Inc., *ISDN Universal Digital Loop Transceivers II*, 1995 (16 pgs.), available at https://www.nxp.com/docs/en/data-sheet/MC145421.pdf.
Office communication in U.S. Appl. No. 15/472,609 (SILA388), dated Aug. 31, 2018, 16 pgs.
Office communication in U.S. Appl. No. 15/370,674 (SILA382), dated Sep. 20, 2018, 13 pgs.
Office communication in U.S. Appl. No. 15/370,693 (SILA383), dated Sep. 20, 2018, 14 pgs.

\* cited by examiner

APPARATUS FOR RECEIVER WITH MULTI-BIT OBSERVATION INTERVAL AND ASSOCIATED METHODS

CROSS-REFERENCE TO RELATED APPLICATIONS

The instant application is a continuation-in part of, and incorporates by reference for all purposes, U.S. patent application Ser. No. 14/080,405, filed on Nov. 14, 2013, titled "Receiver with Signal Arrival Detection Capability." The instant application is also a continuation-in part of, and incorporates by reference for all purposes, U.S. patent application Ser. No. 13/949,837, filed on Jul. 24, 2013, titled "Receiver with Signal Arrival Detection Capability." The instant application is also related to U.S. patent application Ser. No. 15/168,080, filed on May 29, 2016, titled "Apparatus for Receiver With Signal Arrival Detector and Associated Methods."

TECHNICAL FIELD

The disclosure relates generally to communication apparatus and associated methods. More particularly, the disclosure relates to apparatus for receivers with multi-bit observation intervals, and associated methods.

BACKGROUND

With the increasing proliferation of wireless technology, such as Wi-Fi, Bluetooth, and mobile or wireless Internet of things (IoT) devices, more devices or systems incorporate radio frequency (RF) circuitry, such as receivers and/or transmitters. To reduce the cost, size, and bill of materials, and to increase the reliability of such devices or systems, various circuits or functions have been integrated into integrated circuits (ICs). For example, ICs typically include receiver and/or transmitter circuitry. A variety of types and circuitry for transmitters and receivers are used. Transmitters send or transmit information via a medium, such as air, using RF signals. Receivers at another point or location receive the RF signals from the medium, and retrieve the information. Typically, transmitters transmit coded data via RF signals. Receivers receive, decode, demodulate, etc. the RF signals to retrieve the data.

Some wireless communication standards define a preamble for a wireless packet, which is a predefined data pattern that a receiver can use to detect and settle its control loops. The control loops may include the Automatic Gain Control (AGC), Automatic Frequency Compensation (AFC), and Bit Clock Recovery (BCR). After the receiver detects the end of the preamble, the receiver is prepared to receive a full packet including payload data. Some receivers use a preamble detector to detect the arrival of a frame. In response to the preamble detector signaling the detection of the preamble, the receiver begins looking for the next portion of the frame. In the M-bus frame protocol, this next portion is a synchronization (SYNC) word. Under certain circumstances, the preamble detector can occasionally provide a false trigger, such as when a co-channel continuous wave (CW) tone is received at around sensitivity of the preamble detector, or when certain noise patterns are received.

The description in this section and any corresponding figure(s) are included as background information materials. The materials in this section should not be considered as an admission that such materials constitute prior art to the present patent application.

SUMMARY

A variety of communication apparatus and associated methods are contemplated. According to one exemplary embodiment, an apparatus includes a radio frequency (RF) receiver having a multi-bit observation interval. The RF receiver includes a Coordinate Rotation Digital Computer (Cordic) circuit to receive a complex signal derived from RF signals and to generate a phase signal. The RF receiver further includes a timing correlator and frequency offset estimator coupled to receive data derived from a frequency signal derived from the phase signal. The RF receiver in addition includes a Viterbi decoder coupled to provide decoded data derived from the frequency signal.

According to another exemplary embodiment, an IC includes an RF receiver, which includes a Cordic) circuit to receive in-phase and quadrature signals derived from RF signals and to generate phase and amplitude signals. The RF receiver further includes a signal arrival detector to use the phase and amplitude signals to detect arrival of an RF signal and to provide a signal detect output signal. Additionally, the RF receiver includes a timing correlator and frequency offset estimator coupled to receive a frequency signal derived from the phase signal to selectively perform at least one of: (a) initial timing detection, (b) frequency offset estimation, (c) timing tracking, and (d) frequency offset tracking.

According to another exemplary embodiment, a method of receiving RF signals includes receiving time domain signals derived from the RF signals in a Cordic circuit and generating a phase signal. The method further includes using a timing correlator and frequency offset estimator to provide at least one of initial timing detection, frequency offset estimation, timing tracking, and frequency offset tracking using data derived from a frequency signal derived from the phase signal. In addition, the method includes decoding, using a Viterbi decoder, data derived from the frequency signal.

BRIEF DESCRIPTION OF THE DRAWINGS

The appended drawings illustrate only exemplary embodiments and therefore should not be considered as limiting the scope of the application or the claims. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to communication circuitry, such as RF receivers or transceivers. More specifically, the disclosed concepts provide apparatus and methods for receivers with multi-bit observation intervals. In exemplary embodiments, receivers use continuous phase modulation (CPM) techniques and associated demodulators.

Receivers using CPM techniques may use a variety of modulation techniques. Without limitation, examples include continuous phase m-ary frequency shift keying (FSK), Gaussian FSK (GFSK), minimum shift keying (MSK), and Gaussian MSK. When used, Gaussian filtering and channel filtering cause a partial response, which causes deterministic inter symbol interference (ISI). In other words, a certain number of adjacent symbols interfere with each other in a deterministic manner.

The amount of ISI is known so that maximum likelihood sequence estimation (MLSE) can be used to determine the symbol sequence. Use of MLSE allows a reduction in the channel filter bandwidth, which helps to reduce noise, improve immunity against signal interference, and also improves receiver sensitivity.

An efficient way to implement MLSE is by using the Viterbi technique (or algorithm or method or decoding). Receivers according to exemplary embodiments use and implement the Viterbi technique, such as a Viterbi decoder, as described below in detail. Furthermore, receivers according to exemplary embodiments use multi-bit observation intervals. The observation interval is generally equal to the trace back depth in the Viterbi decoder.

In general, receiver performance (e.g., bit error rate (BER), signal to noise ratio (SNR), etc.) improves as the size of the observation interval increases (e.g., from two bits to four bits). The improvement in performance often entails increased complexity of the receiver. A tradeoff may be made between the performance improvement and factors such as receiver cost, complexity, size, etc. As described below in detail, a cost function that is attached to or related to the bit value is also used. If the deviation from the expected value of a bit is relatively large, a high cost value is used, and vice-versa.

Figure 1:
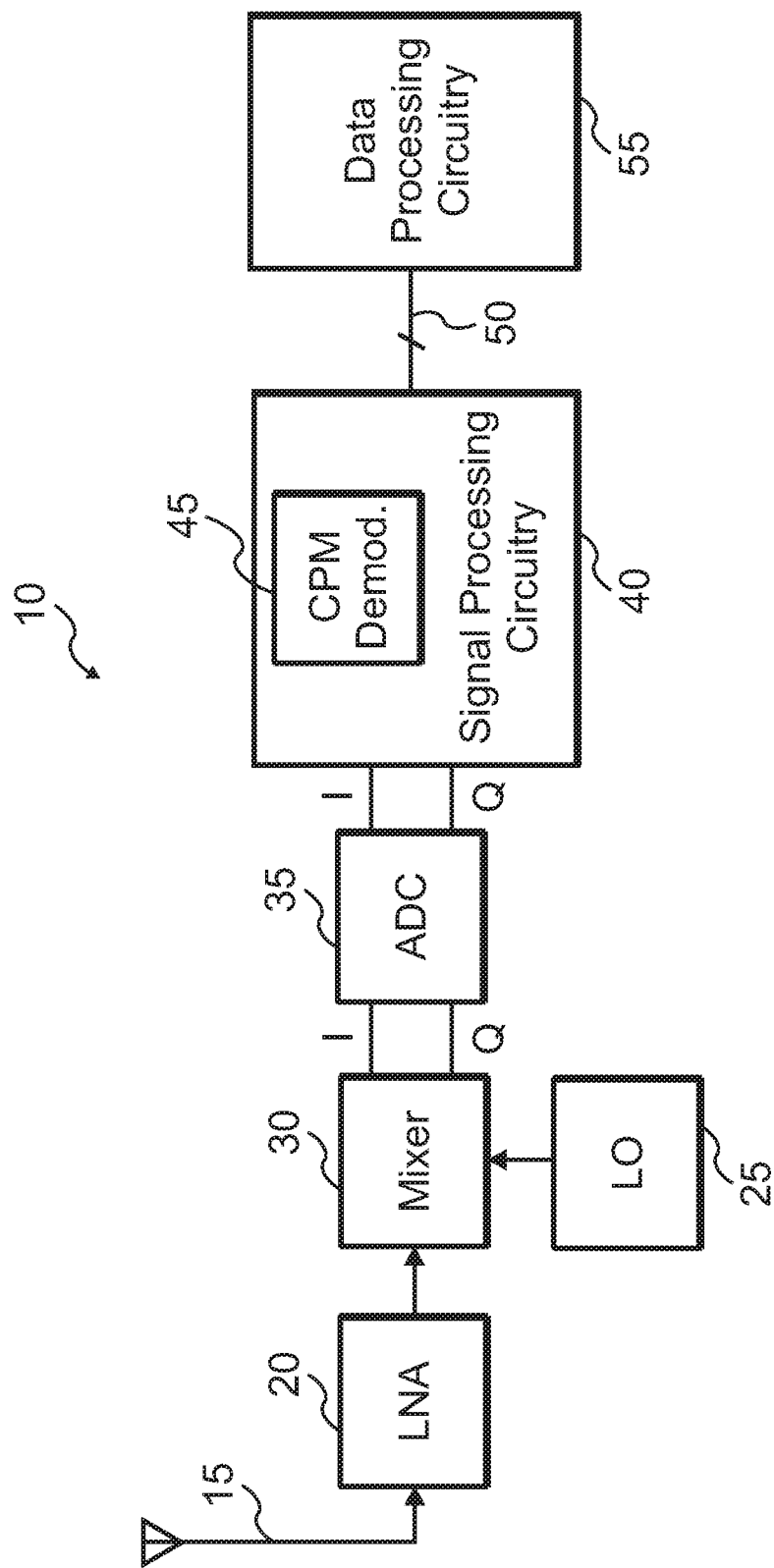
FIG. 1 illustrates a circuit arrangement for a receiver according to an exemplary embodiment.

FIG. 1 illustrates a circuit arrangement for a receiver 10 according to an exemplary embodiment. Receiver 10 receives RF signals via antenna 15. The RF signals feed an input of low noise amplifier (LNA) 20. LNA 20 provides low-noise amplification of the RF signals, and provides amplified RF signals to mixer 30.

Mixer 30 performs frequency translation or shifting of the RF signals, using a reference or local oscillator (LO) frequency provided by LO 25. For example, in some embodiments, mixer 30 translates the RF signal frequencies to baseband frequencies. As another example, in some embodiments, mixer 30 translates the RF signal frequencies to an intermediate frequency (IF).

Mixer 30 provides the translated output signal as a set of two signals, an in-phase (I) signal, and a quadrature (Q) signal. The I and Q signals are analog time-domain signals. Analog to digital converter (ADC) 35 converts the I and Q signals to digital I and Q signals. In exemplary embodiments, ADC 35 may use a variety of signal conversion techniques. For example, in some embodiments, ADC 35 may use delta-sigma (or sometimes called sigma-delta) analog to digital conversion.

ADC 35 provides the digital I and Q signals to signal processing circuitry 40. Generally speaking, signal processing circuitry 40 performs processing on the digital I and Q signals, for example, digital signal processing (DSP). In exemplary embodiments, signal processing circuitry 40 includes CPM demodulator 45. CPM demodulator 45, described below in detail, performs demodulation of the digital I and Q signals to retrieve or extract information, such as data signals, that were modulated (e.g., in a transmitter (not shown)), and provided to antenna 15 as RF signals.

Signal processing circuitry 40 provides information, such as the demodulated data, to data processing circuitry 55 via link 50. Data processing circuitry 55 may perform a variety of functions (e.g., logic, arithmetic, etc.). For example, data processing circuitry 55 may use the demodulated data in a program, routine, or algorithm (whether in software, firmware, hardware, or a combination) to perform desired control or data processing tasks.

In some embodiments, data processing circuitry 55 may perform control of other circuitry, sub-system, or systems (not shown). In some embodiments, data processing circuitry 55 may provide the data (after processing, as desired, for example, filtering) to another circuit (not shown), such as a transducer, display, etc.

In exemplary embodiments, link 50 may take a variety of forms. For example, in some embodiments, link 50 may constitute a number of conductors or coupling mechanisms, such as wires, cables, printed circuit board (PCB) traces, etc. Through link 50, signal processing circuitry 40 and data processing circuitry 55 may exchange information, such as the demodulated data, control information or signals, status signals, etc., as desired.

Figure 2:
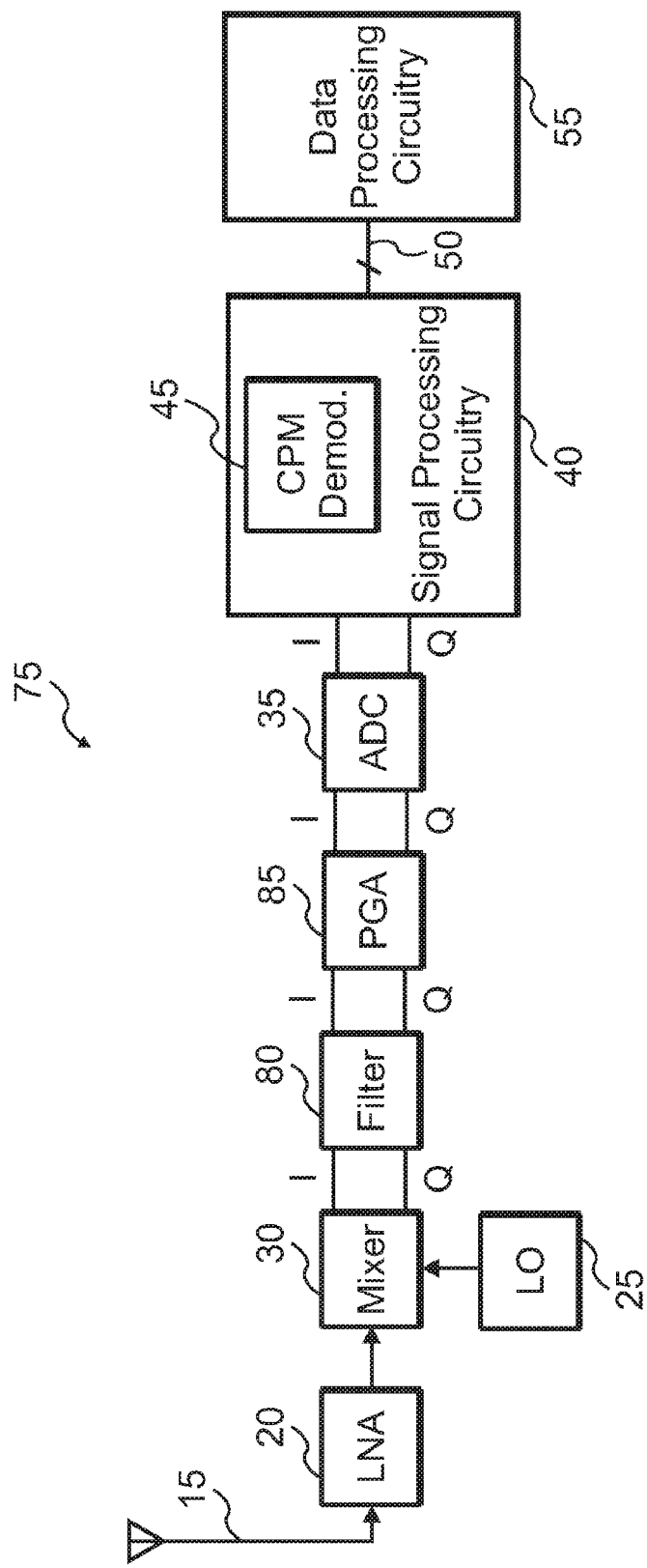
FIG. 2 depicts a circuit arrangement for a receiver according to an exemplary embodiment.

FIG. 2 depicts a circuit arrangement for a receiver 75 according to an exemplary embodiment. Receiver 75 generally has a similar architecture as does receiver 10 (see FIG. 1). Referring again to FIG. 2, receiver 75 includes a filter 80 and a programmable gain amplifier (PGA) 85. Filter 80 provides filtering of the RF or baseband signal at the output of mixer 30. PGA 85 provides programmable gain for the filtered signal at the output of filter 80.

In some embodiments, PGA 85 has a gain that is programmable for different input levels of the RF signals received by antenna 15. In some embodiments, PGA 85 has a gain that is programmable for different frequency bands of the RF signals received by antenna 15. In some embodiments, PGA 85 may include more than one stage of amplification, for example, two or more "slices" of amplifier circuitry coupled in a cascade configuration, as desired. The gain of the various stages may be programmed in a similar or independent manner, as desired.

Note that variations of receiver 75 are possible and contemplated in exemplary embodiments. For example, in some embodiments, receiver 75 may include filter 80, but not PGA 85. Conversely, as another example, in some embodiments, receiver 75 may include PGA 85, but not filter 80. Other possibilities exist, for example, including one or more filters between antenna 15 and LNA 20 to facilitate accommodating several RF signal bands, etc.

Figure 3:
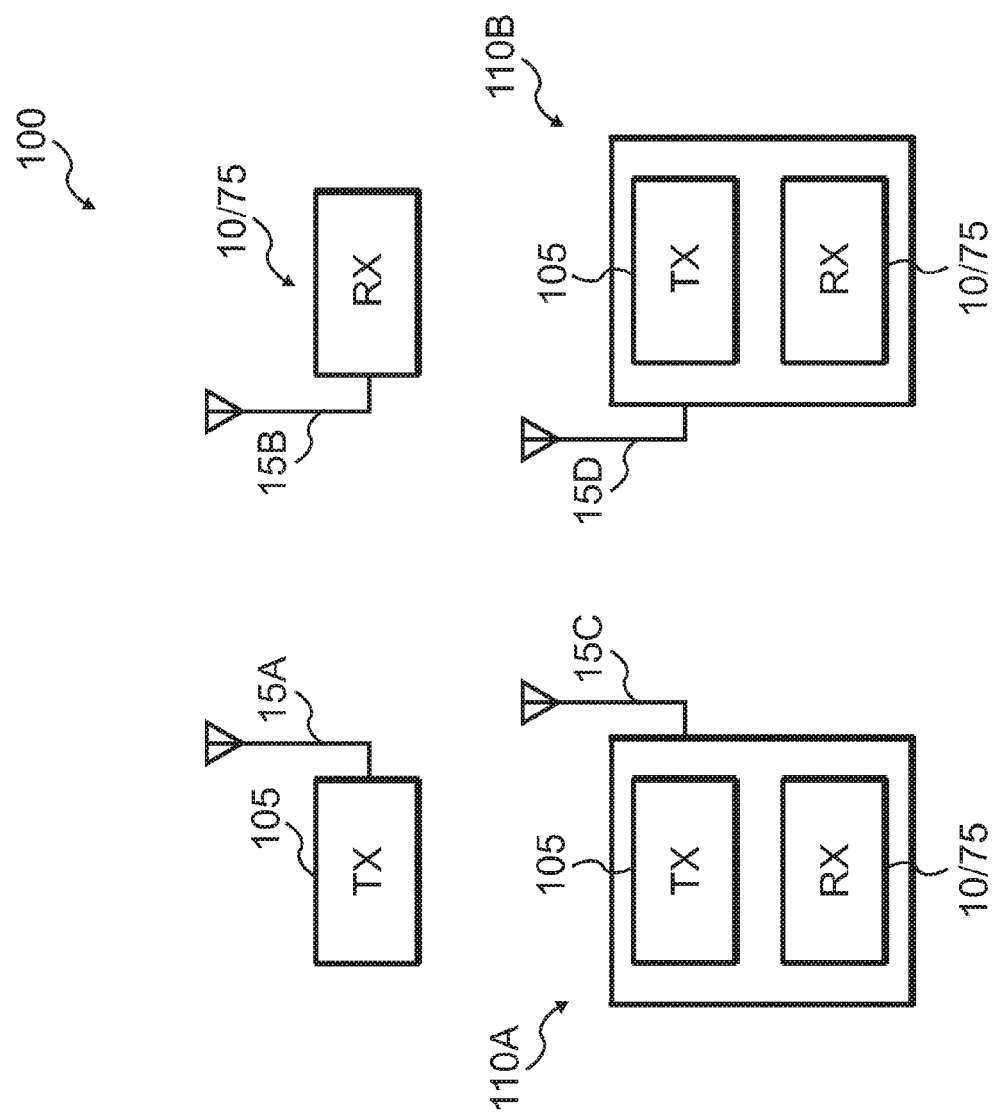
FIG. 3 shows a system for radio communication according to an exemplary embodiment.

Receivers according to exemplary embodiments may be used in a variety of communication arrangements, systems, sub-systems, networks, etc., as desired. FIG. 3 shows a system 100 for radio communication according to an exemplary embodiment.

System 100 includes a transmitter 105, coupled to antenna 15A. Via antenna 15A, transmitter 105 transmits RF signals. The RF signals may be received by receiver 10, described above (alternatively, the receiver may constitute receiver 75, also described above). In addition, or alternatively, transceiver 110A and/or transceiver 110B might receive (via receiver 10 or 75) the transmitted RF signals.

In addition to receive capability, transceiver 110A and transceiver 110B can also transmit RF signals. The transmitted RF signals might be received by receiver 10 or 75, either in the stand-alone receiver, or via the receiver circuitry of the non-transmitting transceiver.

Other systems or sub-systems with varying configuration and/or capabilities are also contemplated. For example, in some exemplary embodiments, two or more transceivers (e.g., transceiver 110A and transceiver 110B) might form a network, such as an ad-hoc network. As another example, in some exemplary embodiments, transceiver 110A and transceiver 110B might form part of a network, for example, in conjunction with transmitter 105.

Figure 4:
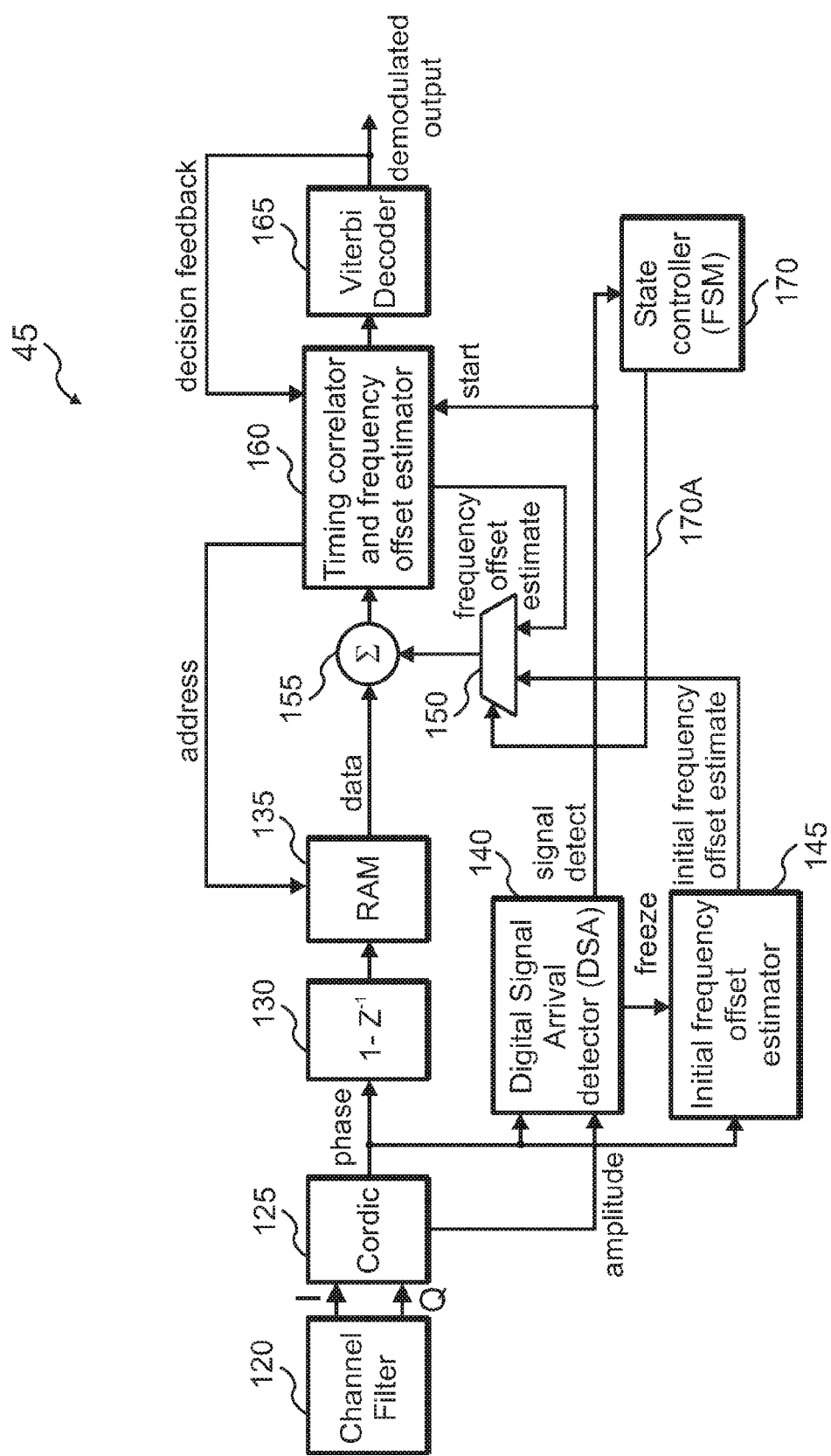
FIG. 4 depicts a circuit arrangement for signal demodulation according to an exemplary embodiment.

As noted above, receivers according to exemplary embodiments use a CPM demodulator that provides multi-bit observation intervals. FIG. 4 depicts a circuit arrangement for a CPM demodulator according to an exemplary embodiment.

The circuit arrangement in FIG. 4 includes an optional channel filter 120. If used, channel filter 120 digitally filters (e.g., low-pass filtering) of an input signal, for example, the I and Q signal from ADC 35 (see FIGS. 1, 2). Referring again to FIG. 4, channel filter 120 provides filtered signals I and Q to Cordic (or Cordic circuit) 125. Compared to the data rate (I and Q signals), Cordic 125 is overclocked in order to cause oversampling of the data signals.

The input I and Q signals to Cordic 125 are time-domain signals. Cordic 125 coverts the time-domain signals to polar (i.e., phase and amplitude) provided as two respective outputs. More specifically, the phase output of Cordic 125 is provided to phase differentiator 130, whereas both the phase and the amplitude outputs are provided to digital signal arrival (DSA) 140. The phase output of Cordic 125 is also provided to initial frequency offset estimator 145.

Phase differentiator 130, having a representative transfer function $1-z^{-1}$, performs phase differentiation of the signal at the phase output of Cordic 125. Phase differentiator 130 provides the differentiated output signal to memory 135 (a random access memory (RAM) in the embodiment shown). Note that in exemplary embodiments phase differentiator 130 operates over symbol intervals at an oversampled rate, not the data rate.

In response to the phase and amplitude signals from Cordic 125, DSA 140 detects or attempts to detect arrival of a data signal. When a signal is detected, DSA 140 provides via an output a "signal detect" signal to timing correlator and frequency offset estimator 160 and to state controller or finite state machine (FSM) (or controller, generally) 170. State controller 170 controls various operations of CPM demodulator 45. State controller 170 may receive and use configuration settings (e.g., via one or more configuration registers (not shown) from a host or other device (not shown)), and use those settings to control the operations of CPM demodulator 45. In exemplary embodiments, state controller 170 may be implemented as a finite-state machine (FSM), as desired. Other implementations of state controller 170 are also contemplated and possible. Examples include general logic circuitry, processors, custom logic, etc.

The "signal detect" signal also serves as a start signal for timing correlator and as a freeze signal to freeze the output of frequency offset estimator 160. Thus, until DSA 140 provides an indication of a signal arrival or detection, the timing correlator in timing correlator and frequency offset estimator 160 and Viterbi decoder 165 are not running. As a result, the power consumption of CPM demodulator 45 and, consequently, of the RF receiver, is reduced. The reduced power consumption may provide longer battery life in mobile applications or reduce the operating costs of the receiver overall.

In some embodiments, DSA 140 examines the eye opening of the input signal to determine whether the input signal constitute a valid signal. In some embodiments, DSA 140 examines or looks for phase spikes (in the phase signal received from Cordic 125). Presence of phase spikes would indicate that a valid signal has not arrived. In some embodiments, DSA 140 examines figures of merit, such as receiver signal strength indication or indicator (RSSI). A combination of the foregoing techniques may be used to perform signal arrival detection, as desired.

Initial frequency offset estimator 145 provides an initial frequency offset estimate to multiplexer (MUX) 150. The frequency offset occurs because the transmitter (not shown) typically uses an oscillator (e.g., crystal oscillator) whose frequency is not exactly at the center frequency of the channel. Initial frequency offset estimator 145 provides an estimated frequency correction to correct the offset. Initial frequency offset estimator 145 typically detects the average frequency offset by differentiating the phase signal provided by Cordic 125. For example, averaging may be obtained by differentiating subsequent samples and accumulating the differentiated values for two or four symbols long. When the freeze signal is asserted, the last completed accumulation is presented at the output of the initial frequency offset estimator. Initial frequency offset estimator may be implemented in a variety of ways, as persons of ordinary skill in the art will understand. The choice of implementation depends on factors such as design and performance specifications, general receiver architecture, receiver cost, complexity, size, system specifications, and the like, as persons of ordinary skill in the art will understand.

Initial frequency offset estimator 145 operates in response to a "freeze" signal from DSA 140. The "freeze" signal instructs the initial frequency offset estimator 145 to stop examining the phase signal from Cordic 125 and to provide a frequency offset initial estimate to adder 155.

Adder 155 receives another input from timing correlator and frequency offset estimator 160. Specifically, timing correlator and frequency offset estimator 160 provides a frequency offset estimate signal to adder 150. The initial frequency offset estimation is frozen when DSA 140 indicates that a signal has been detected (via the "signal detect" signal) and, subsequently, the initial frequency offset estimate (from initial frequency offset estimator 145) is used by the correlator in timing correlator and frequency offset estimator 160 to obtain the initial symbol timing and frequency offset estimate.

Data from RAM 135 drives another input of adder 155. The data are provided in response to address signals provided to RAM 135 from timing correlator and frequency offset estimator 160. RAM 135 receives and stores samples from phase differentiator 130. Because the derivative of phase constitutes frequency, the output of phase differentiator 130 includes frequency data. Thus, the samples stored in RAM 135 represent frequency information. RAM 135 contains over sampled data (differentiated phase over symbol interval at the oversampling rate). After signal arrival is detected (as indicated by DSA 140), the correlator in timing correlator and frequency offset estimator 160 is used to find a minimum cost function.

After DSA 140 detects a signal arrival, frequency information from RAM 135 is added to the frequency offset estimate to provide corrected frequency information to timing correlator and frequency offset estimator 160 and Viterbi decoder 165. DSA 140 might trigger somewhat earlier or later than nominal (for example, because of trigger jitter). An exhaustive search extends the search window to include the expected or worst case trigger jitter. More specifically, timing correlator and frequency offset estimator 160 runs an exhaustive search using the timing correlator functionality by examining all possible combinations of the data in RAM 135 to find a lowest cost function in order to determine the symbol boundaries. The exhaustive search runs through all sample intervals to determine a maximum likelihood of the start of the SYNC word (the SYNC word typically follows after the preamble, and indicates the start of data). Alternatively, the exhaustive search may be replaced by another search technique, process, algorithm, etc., for example, applying a fixed or dynamic threshold for comparison with the cost function.

In some embodiments, RAM 135 is organized as a circular buffer, and constantly receives and stores samples from phase differentiator 130. Other implementations might be used, depending on factors such as design and performance specifications, general receiver architecture, system specifications, and the like, as persons of ordinary skill in the art will understand.

Timing correlator and frequency offset estimator 160 is a block that provides several different functionalities. First, timing correlator and frequency offset estimator 160 detects timing boundaries of symbols. When symbol boundaries are known, controller 170 selects data symbols in RAM 135 and feeds those data symbols, after compensated for frequency errors to Viterbi decoder 165. Timing correlator and frequency offset estimator 160 also tracks frequency and timing error and, if appropriate or desired, changes the frequency offset estimate to correct the frequency offset.

Viterbi decoder 165 decodes the bitstream in the signal received from adder 155 to demodulate the received signal. At its input, Viterbi decoder 165 receives "soft code," i.e., symbols provided to Viterbi decoder 165 are not necessarily binary 0 or binary 1 (e.g., if 0 is represented by 10 and 1 is represented by −10, the signals provided to Viterbi decoder 165 might be 9, 11, −12, etc.). Viterbi decoder 165 uses information on multiple bits to make decisions regarding one bit of data, i.e., to determine whether a given bit is binary 0 or binary 1. Put another way, Viterbi decoder 165 is fed with different "soft" symbols and makes decisions based on symbols that arrive first and later (the value of the first symbol is decoded based on the first "soft" symbol and several "soft" symbols arriving later). Viterbi decoder 165 is populated or fed with soft symbols from phase differentiator 130. When one symbol is decoded, an additional "soft" symbol is shifted in, and a second symbol is decoded or detected based on a number of subsequent "soft" symbols, for example, four "soft" symbols.

Viterbi decoder 165 provides at its output demodulated data or signals. The output signal of Viterbi decoder 165 is fed back to timing correlator and frequency offset estimator 160 as a "decision feedback" signal. That signal allows timing correlator and frequency offset estimator 160 to adapt to the content of a frame of data. More specifically, the "decision feedback" signal is used to run timing correlator and frequency offset estimator 160 to perform a timing tracking operation or a frequency offset estimate operation. The operations compensate for timing and frequency drift, as typically happens over time. In exemplary embodiments, Viterbi decoder 165 may be replaced with any other decoder that performs MLSE. An example of another MLSE algorithm is published by Schalkwijk, Vinck and Post, "Syndrome decoding of binary rate k/n convolutional codes," IEEE Transactions on Information Theory (1978).

In some embodiments, Viterbi decoder 165 may apply other schemes, for example, where a symbol has four different values. Generally, Viterbi decoder 165 may be implemented in various embodiments to accommodate m-ary modulation, as desired.

As noted, the timing correlator and frequency offset estimator 160 is disabled until a signal arrival is detected. Given that the power consumption of DSA 140 is lower than the correlator, less power is dissipated. Given that relatively large amounts of power are typically consumed in preamble search mode in a receiver, use of DSA 140 in the manner described provides reduction of the overall power consumption of the receiver.

Thus, to summarize, the circuit arrangement in FIG. 4, for example, Cordic 125 and phase differentiator 130, may be used to build a receiver with multi-bit observation interval. The timing correlator is started using a signal detect indication from DSA 140 and an initial frequency offset estimate from controller 170. Timing correlator and frequency offset estimator 160 serves as a multi-purpose correlator engine.

Figure 5:
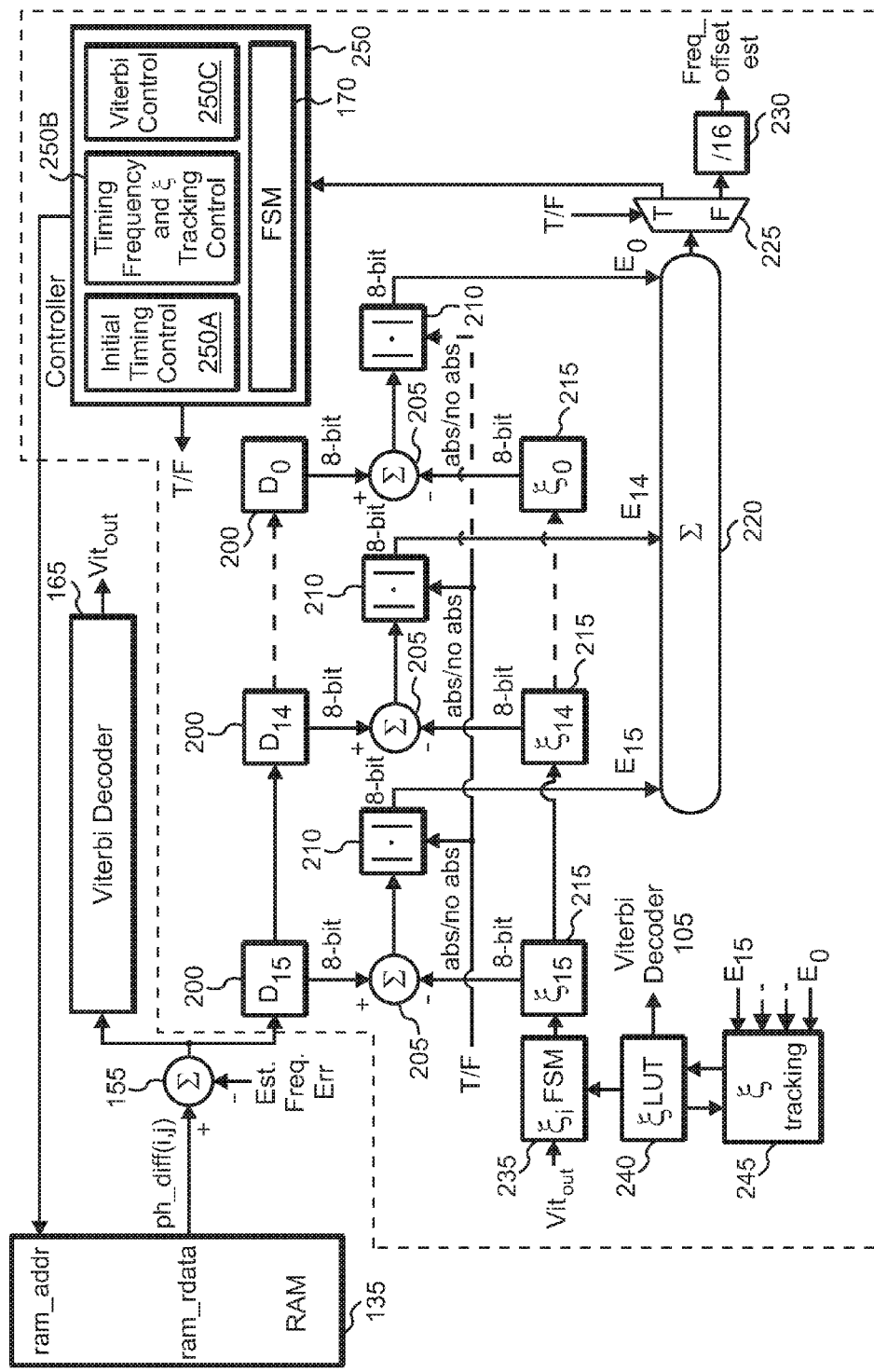
FIG. 5 illustrates a circuit arrangement for a timing correlator and frequency offset estimator according to an exemplary embodiment.

More specifically, timing correlator and frequency offset estimator 160 performs the following functions: (a) initial timing detection (finding the symbol boundaries) or estimation (exhaustive search); (b) second frequency offset estimation (the first estimation is performed by initial frequency offset estimator 145); (c) timing tracking (to compensate for changes, over time, in symbol boundaries); and (d) frequency offset tracking (to compensate for changes over time in the frequency offset). Using one block or subsystem reduces the number of circuit elements, such as gates, to provide the above functionality, which in turn results in reduced semiconductor die area and, hence, cost. FIG. 5 illustrates a circuit arrangement for a timing correlator and frequency offset estimator 160 according to an exemplary embodiment. Note that FIG. 5 also includes RAM 135, adder 155, and Viterbi decoder 165 to facilitate presentation.

A controller 250 controls the overall functionality of the circuitry shown in FIG. 5. Controller 250A includes FSM 170, described above, which controls the various functions of controller 250. Initial timing control 250A controls the initial timing function or detection of timing correlator and frequency offset estimator 160. Viterbi control 250C controls the operation of Viterbi decoder 165. Timing, frequency, and coefficient ($\xi$) tracking control controls the timing tracking, frequency offset tracking, and coefficient tracking functionality of timing correlator and frequency offset estimator 160.

Timing correlator and frequency offset estimator 160 includes a set of registers labeled $D_1$-$D_{15}$ (i.e., 16 bits, in the exemplary embodiment shown) coupled to form shift register 200. The first register in shift register 200 receives its input from the output of adder 155. The output of each register in shift register 200 feeds an input of a corresponding subtracter 205. A second input of each corresponding subtracter 205 is fed by the respective outputs of a set of corresponding coefficient registers 215. Coefficient registers 215 include coefficients, denoted as $\xi$, that are derived from the data preamble and SYNC word. For example, in the embodiment shown, the coefficients ($\xi_0$-$\xi_{15}$) include 6 bits derived from the preamble, and 10 bits from the SYNC word. Other configurations, including number of bits, for the coefficients are contemplated and may be used, as desired.

Subtracters 205 compare the actual values (from shift register 200, whose outputs are derived from frequency compensated data in RAM 135) and the expected values (from coefficient registers 205) of the data sequence. The outputs of subtracters 205 feed absolute value circuits 210. Under the control of the T/F signal (described below), each of absolute value circuits 210 conditionally (depending on the value of the T/F signal) generates at its output the absolute value of its input signal. The outputs of absolute value circuits are labeled as error signals $E_0$-$E_{15}$ in FIG. 5. The operation of absolute value circuits 210 depends on the value of the T/F signal. When timing correlator and frequency offset estimator 160 operates in the frequency offset estimation or tracking modes, the T/F function has a logic low value, which causes absolute value circuits 210 to bypass their respective absolute value function (i.e., the output value of the input to a respective absolute value circuit 210 has the same sign as its input value).

Conversely, when timing correlator and frequency offset estimator 160 operates in the initial timing detection or timing tracking modes, the T/F function has a logic high value, which causes absolute value circuits 210 to use an absolute value function (i.e., the output value of a respective absolute value circuit 210 has the sign bit removed). Controller 150 provides the T/F signal to absolute value circuits 210 and also to demultiplexer (DeMUX) 225.

Error signals ($E_0$-$E_{15}$) at the outputs of absolute value circuits 210 are added together by adder 220 to generate a sum of error signals, which is provided as the input of DeMUX 225. During the frequency offset estimation or tracking modes, divider 230 divides by 16 the sum of the error signals (i.e., generates an average error signal or value), and provides the result as the frequency offset estimate of timing correlator and frequency offset estimator 160. Conversely, during the initial timing detection or timing tracking modes of timing correlator and frequency offset estimator 160, the sum of the error signals is provided to controller 250, and is used to generate addresses used to retrieve data from RAM 135.

Referring again to FIG. 5, error signals ($E_0$-$E_{15}$) are also provided to coefficient tracking circuit 245, which operates in conjunction with coefficient lookup table (LUT) 240 and coefficient FSM 235. Error signals ($E_0$-$E_{15}$) are used to obtain coefficients from coefficient LUT 240, and are provided to Viterbi decoder 165. Coefficient FSM 235 receives the coefficient values from coefficient LUT 240, and also receives the output (demodulated signal) of Viterbi decoder 165. Coefficient FSM updates the coefficient values once it has information (from Viterbi decoder 165) about the received frame of data, such as its contents, what the frame of data looks like, etc. Thus, because of the feedback from the Viterbi decoder 165 output to coefficient FSM 235, the coefficient values are overall determined or updated or adjusted by the output signal of Viterbi decoder 165. In this arrangement the coefficients in both the Viterbi and cost function engine can be adapted to non-deterministic variations, such as filtering over the air (usually induced by multipath propagation), and imperfections in the modulation of the transmitter. The coefficient tracking circuit updates the coefficients in the coefficient LUT 240 using the errors signals ($E_0$-$E_{15}$). For example a relatively small part of the error is added to the associated coefficient. In this way, averaging is obtained when multiple correction cycles are used, which helps to suppress noise on the coefficients in the coefficient LUT 240.

Figure 6:
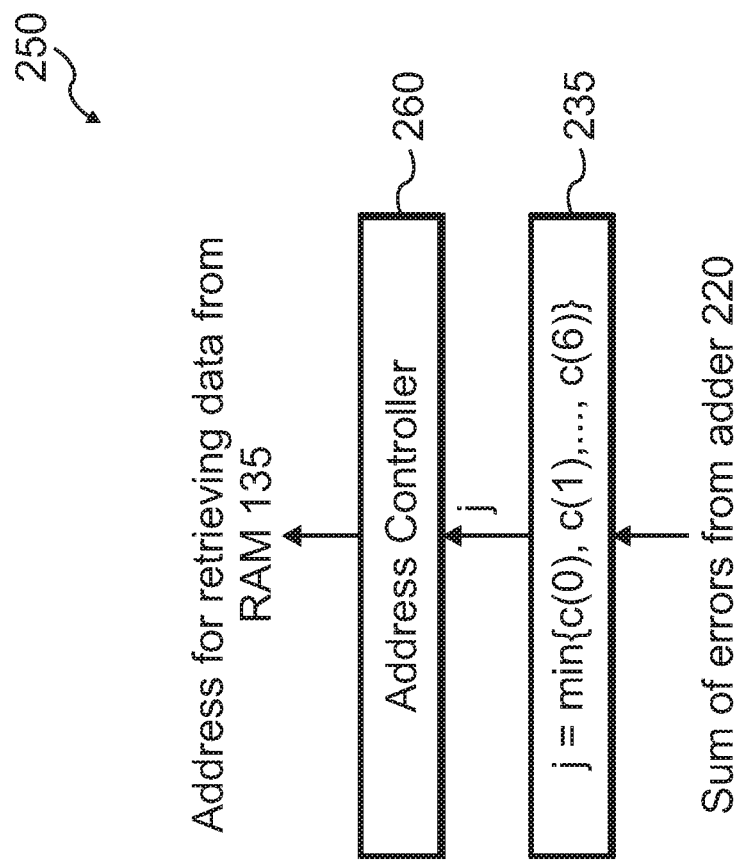
FIG. 6 depicts a partial block diagram of a controller according to an exemplary embodiment

As noted, during the initial timing detection or timing tracking modes of timing correlator and frequency offset estimator 160, the sum of the error signals is provided to controller 250. Controller 250 determines the lowest or the minimum of the set of cost functions (C(0) through C(6), assuming an oversampling ratio of 7), j, such that j=min[C(0), C(1), . . . , C(6)], where "min" represents the minimum function. The set of cost functions may be expanded to accommodate the trigger jitter from DSA 140, discussed above. The cost functions results from the shifting of more data through shift register 200, and is similar to the cost function used in the Viterbi technique. The value j is used to map addresses to retrieve data from RAM 135 to conduct an exhaustive search, as described above. FIG. 6 depicts a circuit arrangement for a part of controller 250 according to an exemplary embodiment to implement this functionality. Using the sum of the error signals, minimum cost calculator circuit 255 determines the value j as the minimum of cost functions. Address controller 260 uses the value j to determine or map addresses used to retrieve data from RAM 135.

The timing correlator and frequency offset estimate outputs of timing correlator and frequency offset estimator 160 are provided as:

$$\text{Timing\_corr} = \sum_{i=0}^{15} |D_i - \xi_i| \quad \text{and} \quad \text{Freq\_offset\_est} = \frac{1}{16} \sum_{i=0}^{15} (D_i - \xi_i),$$

where $D_i$ and $\xi_i$ represent, respectively, the output of the i-th register in shift register 200 (data from RAM 135, as frequency compensated), and the i-th coefficient ($\xi$).

Figure 7:
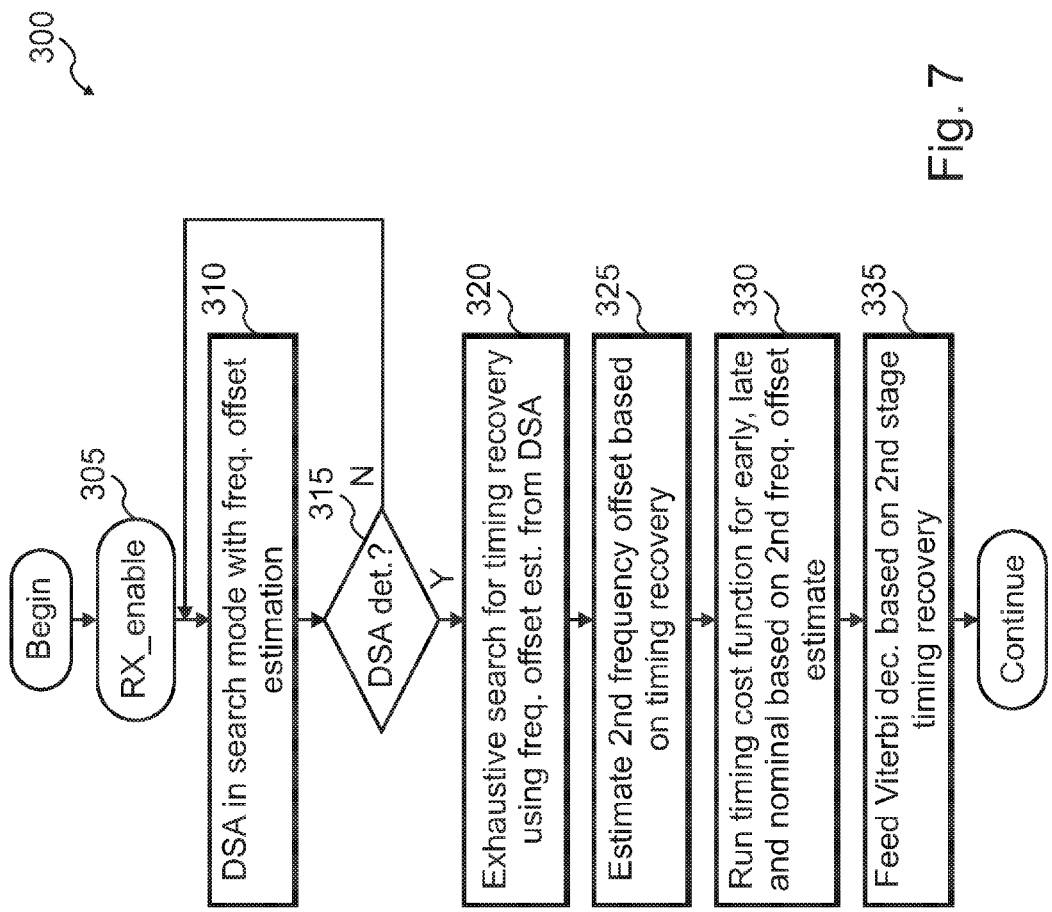
FIG. 7 illustrates a flow diagram for a method of timing and frequency acquisition according to an exemplary embodiment.

FIG. 7 illustrates a flow diagram 300 for a method of timing and frequency acquisition, such as an initial timing and frequency acquisition, according to an exemplary embodiment. At 305, the receiver or the receive functionality is enabled, as indicated by RX_enable. At 310, DSA 140 is in search mode with initial frequency offset estimator 145 enabled. At 315 a determination is made whether DSA 140 has indicated a signal arrival or detection. If not, frequency offset is measured or estimated as long as there no signal detection or arrival indicated. If yes, however, at 320 an exhaustive search for timing recovery is made, using the initial frequency offset estimation from initial frequency offset estimator 145. The frequency offset measurement or estimate is obtained just before (e.g., 4 bits before) DSA 140 detects a signal is used as an initial frequency offset correction.

At 325, an estimate is made of a second frequency offset, based on symbol timing recovery information. At 330, timing cost functions are run for a second stage timing recovery for early, nominal, and late timing, based on the second frequency offset estimate. At 335, Viterbi decoder 165 is fed with data, based on the second stage timing recovery and the second frequency offset estimate.

Figure 8:
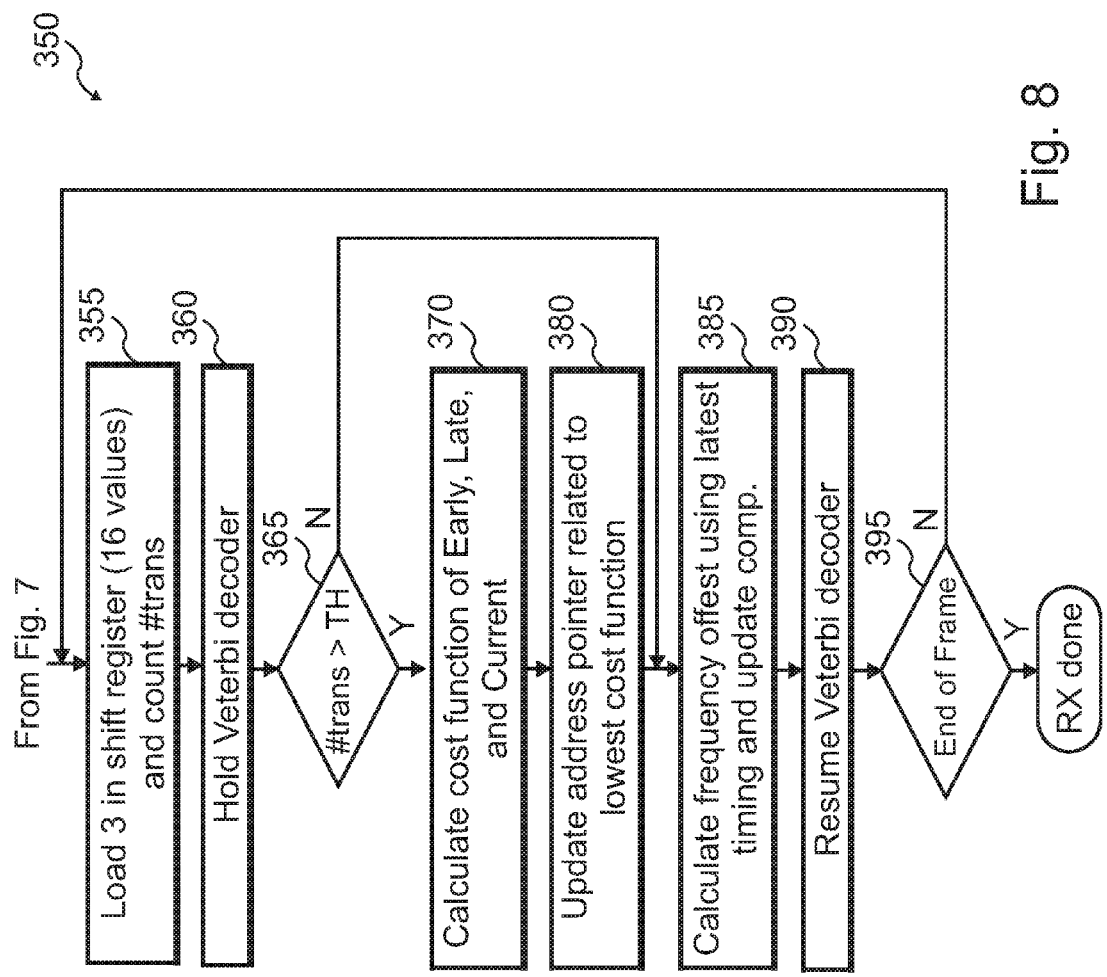
FIG. 8 shows a flow diagram for a method of frequency and timing tracking according to an exemplary embodiment.

FIG. 8 shows a flow diagram 350 for a method of frequency and timing tracking according to an exemplary embodiment. In exemplary embodiments, the operations shown in FIG. 8 occur following the operations shown in flow diagram 300 of FIG. 7, i.e., block 355 (FIG. 8) follows block 335 (FIG. 7). Referring to FIG. 8, at 355, the coefficients ($\xi_t$) are loaded in coefficient registers 205, and a count of the number of signal transitions (#trans) is started. At 360, Viterbi decoder 165 is held, i.e., does not operate on any data, and its output signal is held. At 365, a check is made whether the number of signal transitions (#trans) exceeds a threshold, denoted by "TH." If so, at 370 cost functions of early, late, and current (nominal) timing are calculated, and at 380 the address pointer (used to retrieve data from RAM 135) related to the lowest cost function is updated. If the number of signal transitions does not exceeds the threshold, control passes from 365 to 385 (When there are no transitions in the received signal (e.g., relatively long streams of binary 1s or binary 0s, there is insufficient information for the timing correction or timing tracking circuitry of timing correlator and frequency offset estimator 160 to find accurate symbol timing. Thus, a stream of certain size (smaller than "TH") of signal transitions is skipped or ignored by the timing tracking loop.) Note that TH can be made dependent on the properties of the received signal. For example, if the cost function of a previous timing correlation shows low cost at the symbol boundaries, a lower TH can be selected since noise distortion is deemed relatively low. Alternatively the RSSI can be used to reduce the TH at higher signal strengths. The cost function of a previous timing correlation at the symbol boundaries (e.g., minimum cost after an exhaustive search, or minimum cost after early, late, and nominal evaluation) can be used as a signal quality indicator (SQI).

At 385, the frequency offset is calculated using the latest timing information, and computations are updated. The latest timing information comes from the preceding early, late, and nominal timing evaluation. Note that every 16 symbols, new data for the coefficients (ξ) are available from Viterbi decoder 165. If timing drift exists, then the address value or pointer used to retrieve data from RAM 135 no longer has a correct value. Every 16 symbols, a check is made for timing drift, and a correction is made, as appropriate. More specifically, at the end of the 16 cycles corresponding to 16 symbols, the coefficients are populated through decision feedback from the output of Viterbi decoder 165 to the cost function engine or circuit, after which Viterbi decoder 165 is put on hold or paused or stopped, and samples are loaded into the cost function engine, first in early followed by current and late, and the symbol is retrieved from the address RAM 135 associated with the lowest cost function corresponding to early, nominal, or late timing.

At 390, operation of Viterbi decoder 165 resumes. At 395 a check is made whether the end of the data frame has been reached. If not, control returns to 355, and the process shown repeats. If the end of the data frame has been reached, then reception of the current data frame is finished. (Note that the process shown may be repeated for additional frames of data, as desired.)

Figure 9:
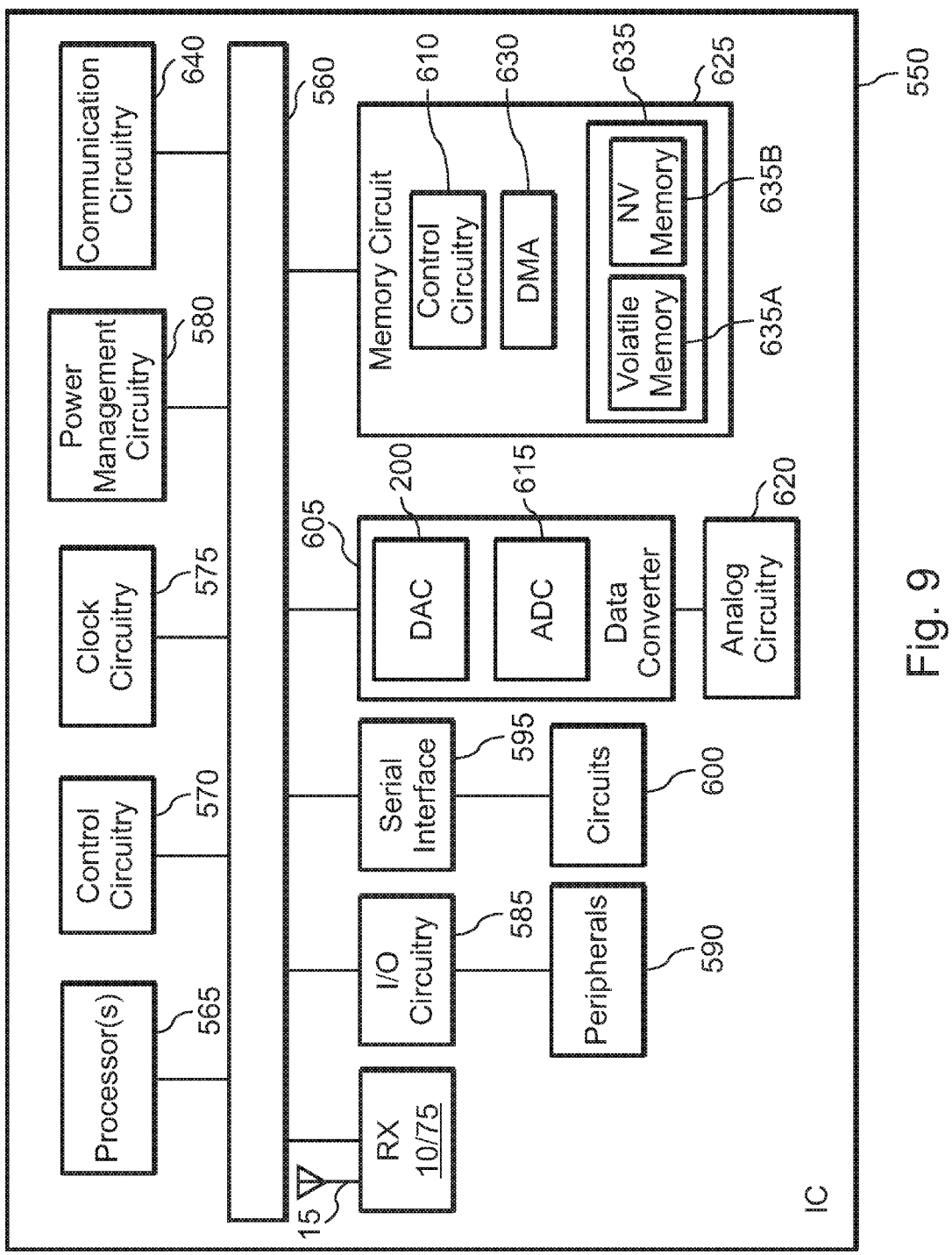
FIG. 9 illustrates a block diagram of an IC according to an exemplary embodiment.

Receivers according to exemplary embodiments may be combined with other circuitry, for example, by integrating the receiver and signal processing, logic, or computing circuitry within an IC. FIG. 9 illustrates an IC 550, for example, a microcontroller unit (MCU), that combines a receiver with other circuit blocks according to an exemplary embodiment.

IC 550 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductors for communicating information, such as data, commands, status information, and the like.

IC 550 may include link 560 coupled to one or more processors 565, clock circuitry 575, and power management circuitry 580. In some embodiments, processor(s) 565 may include circuitry or blocks for providing computing functions, such as central-processing units (CPUs), arithmetic-logic units (ALUs), and the like. In some embodiments, in addition, or as an alternative, processor(s) 565 may include one or more digital signal processors (DSPs). The DSPs may provide a variety of signal processing functions, such as arithmetic functions, filtering, delay blocks, and the like, as desired. In some embodiments, functionality of parts of receiver 10/75, such as those described above, may be implemented or realized using some of the circuitry in processor(s) 565, as desired.

Referring again to FIG. 9, clock circuitry 575 may generate one or more clock signals that facilitate or control the timing of operations of one or more blocks in IC 550. Clock circuitry 575 may also control the timing of operations that use link 560. In some embodiments, clock circuitry 575 may provide one or more clock signals via link 560 to other blocks in IC 550.

In some embodiments, power management circuitry 580 may reduce an apparatus's (e.g., IC 550) clock speed, turn off the clock, reduce power, turn off power, or any combination of the foregoing with respect to part of a circuit or all components of a circuit. Further, power management circuitry 580 may turn on a clock, increase a clock rate, turn on power, increase power, or any combination of the foregoing in response to a transition from an inactive state to an active state (such as when processor(s) 565 make a transition from a low-power or idle or sleep state to a normal operating state).

Link 560 may couple to one or more circuits 600 through serial interface 595. Through serial interface 595, one or more circuits coupled to link 560 may communicate with circuits 600. Circuits 600 may communicate using one or more serial protocols, e.g., SMBUS, I²C, SPI, and the like, as person of ordinary skill in the art will understand.

Link 560 may couple to one or more peripherals 590 through I/O circuitry 585. Through I/O circuitry 585, one or more peripherals 590 may couple to link 560 and may therefore communicate with other blocks coupled to link 560, e.g., processor(s) 365, memory circuit 625, etc.

In exemplary embodiments, peripherals 590 may include a variety of circuitry, blocks, and the like. Examples include I/O devices (keypads, keyboards, speakers, display devices, storage devices, timers, etc.). Note that in some embodiments, some peripherals 590 may be external to IC 550. Examples include keypads, speakers, and the like. In some embodiments, with respect to some peripherals, I/O circuitry 585 may be bypassed. In such embodiments, some peripherals 590 may couple to and communicate with link 560 without using I/O circuitry 585. Note that in some embodiments, such peripherals may be external to IC 550, as described above.

Link 560 may couple to analog circuitry 620 via data converter 605. Data converter 405 may include one or more ADCs 615 and/or one or more DACs 200. The ADC(s) 615 receive analog signal(s) from analog circuitry 620, and convert the analog signal(s) to a digital format, which they communicate to one or more blocks coupled to link 560. Conversely, DAC(s) 200 receive one or more digital signals from one or more blocks coupled to link 560, and convert the digital signal(s) to an analog format. The analog signal(s) may be provided to circuitry within (e.g., analog circuitry 620) or circuitry external to IC 550, as desired. Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 550 to form more complex systems, sub-systems, control blocks, and information processing blocks, as desired.

Control circuitry 570 couples to link 560. Thus, control circuitry 570 may communicate with and/or control the operation of various blocks coupled to link 560. In addition or as an alternative, control circuitry 570 may facilitate communication or cooperation between various blocks coupled to link 560. In some embodiments, the functionality or circuitry of control circuits in receiver 10/75 (e.g., controller 170 or 250 described above) may be combined with or included with the functionality or circuitry of control circuitry 570, as desired.

Referring again to FIG. 9, in some embodiments, control circuitry 570 may initiate or respond to a reset operation. The reset operation may cause a reset of one or more blocks coupled to link 560, of IC 550, etc., as person of ordinary skill in the art will understand. For example, control circuitry 570 may cause receiver 10/75 to reset to an initial state. In exemplary embodiments, control circuitry 570 may include a variety of types and blocks of circuitry. In some embodiments, control circuitry 570 may include logic circuitry, FSMs, or other circuitry to perform a variety of operations, such as the operations described above.

Communication circuitry 640 couples to link 560 and also to circuitry or blocks (not shown) external to IC 550. Through communication circuitry 640, various blocks coupled to link 560 (or IC 550, generally) can communicate with the external circuitry or blocks (not shown) via one or more communication protocols. Examples include universal serial bus (USB), Ethernet, and the like. In exemplary embodiments, other communication protocols may be used, depending on factors such as specifications for a given application, as person of ordinary skill in the art will understand.

As noted, memory circuit 625 couples to link 560. Consequently, memory circuit 625 may communicate with one or more blocks coupled to link 560, such as processor(s) 365, control circuitry 570, I/O circuitry 585, etc. In the embodiment shown, memory circuit 625 includes control circuitry 610, memory array 635, and direct memory access (DMA) 630. Control circuitry 610 controls or supervises various operations of memory circuit 625. For example, control circuitry 610 may provide a mechanism to perform memory read or write operations via link 360. In exemplary embodiments, control circuitry 610 may support various protocols, such as double data rate (DDR), DDR2, DDR3, and the like, as desired. In some embodiments, the memory read and/or write operations involve the use of one or more blocks in IC 550, such as processor(s) 565. DMA 630 allows increased performance of memory operations in some situations. More specifically, DMA 630 provides a mechanism for performing memory read and write operations directly between the source or destination of the data and memory circuit 625, rather than through blocks such as processor(s) 565.

Memory array 635 may include a variety of memory circuits or blocks. In the embodiment shown, memory array 635 includes volatile memory 635A and non-volatile (NV) memory 635B. In some embodiments, memory array 635 may include volatile memory 635A. In some embodiments, memory array 635 may include NV memory 635B. NV memory 635B may be used for storing information related to performance or configuration of one or more blocks in IC 550. For example, NV memory 635B may store configuration information related to various operations of receiver 10/75 and/or to initial or ongoing configuration or control of receiver 10/75, as desired.

As described above in detail, receiver 10/75 receives RF signals via antenna 15, and processes those signals. The resulting data signals are provided to one or more blocks of circuitry in IC 550 via link 560. Furthermore, various blocks of circuitry in IC 550 may be used to process the received data and to generate additional data or signals, which may be used to control other circuitry, etc. In some embodiments, a transmitter (not shown) may be included in IC 550. In such configurations, the transmitter may transmit information generated or processed in IC 550, such as information derived from, based on, or related to data received by receiver 10/75. Thus, sophisticated control and communication subsystems, blocks, circuits, or systems for processing information and/or control may be implemented.

Various circuits and blocks described above and used in exemplary embodiments may be implemented in a variety of ways and using a variety of circuit elements or blocks. For example, channel filter 120, Cordic 125, phase differentiator 130, RAM 135, adder 155, timing correlator and frequency offset estimator 160, Viterbi decoder 165, controller 170, DSA 140, initial frequency offset estimator 145, DeMUX 225, divider 230, adder 220, coefficient registers 215, adders 205, absolute value circuits 210, FSM 235, coefficient LUT 240, minimum cost calculator circuit 255, address controller 260, and coefficient tracking circuit 245 may generally be implemented using digital circuitry. The digital circuitry may include circuit elements or blocks such as gates, digital MUXs, latches, flip-flops, registers, FSMs, processors, programmable logic (e.g., field programmable gate arrays (FPGAs) or other types of programmable logic), arithmetic-logic units (ALUs), standard cells, custom cells, etc., as desired, and as persons of ordinary skill in the art will understand. In addition, analog circuitry or mixed-signal circuitry or both may be included, for instance, power converters, discrete devices (transistors, capacitors, resistors, inductors, diodes, etc.), and the like, as desired. The analog circuitry may include bias circuits, decoupling circuits, coupling circuits, supply circuits, current mirrors, current and/or voltage sources, filters, amplifiers, converters, signal processing circuits (e.g., multipliers), detectors, transducers, discrete components (transistors, diodes, resistors, capacitors, inductors), analog MUXs and the like, as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

As persons of ordinary skill in the art will understand, one may apply the disclosed concepts effectively to various electronic devices, apparatus, circuitry, systems, blocks, and/or subsystems. Examples described in this document (e.g., MCU) constitute merely illustrative applications, and are not intended to limit the application of the disclosed concepts to other types of electronic devices, such as other types of IC, by making appropriate modifications, as persons of ordinary skill in the art will understand.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus, comprising:
   a radio frequency (RF) receiver having a multi-bit observation interval, the RF receiver comprising a:
      a Coordinate Rotation Digital Computer (Cordic) circuit to receive a complex signal derived from RF signals and to generate a phase signal;
      a timing correlator and frequency offset estimator circuit coupled to receive data derived from a frequency signal derived from the phase signal; and
      a Viterbi decoder circuit coupled to provide decoded data derived from the frequency signal.

2. The apparatus according to claim 1, further comprising a phase differentiator circuit to differentiate the phase signal and to provide a frequency signal.

3. The apparatus according to claim 2, further comprising a random access memory circuit to receive the frequency signal.

4. The apparatus according to claim 3, further comprising an adder circuit to add data from the random access memory circuit to a frequency offset estimate to generate a sum and to provide the sum to the timing correlator and frequency offset estimator circuit.

5. The apparatus according to claim 4, wherein the frequency offset estimate comprises an initial frequency offset estimate provided by an initial frequency offset estimator circuit.

6. The apparatus according to claim 4, wherein the frequency offset estimate comprises a frequency offset estimate provided by the timing correlator and frequency offset estimator circuit.

7. The apparatus according to claim 1, wherein a feedback signal is used by the timing correlator and frequency offset estimator circuit to perform a timing estimation operation or a frequency offset estimate operation for tracking of timing or frequency drift, respectively.

8. The apparatus according to claim 1, wherein the timing correlator and frequency offset estimator circuit selectively performs at least one of: (a) initial timing detection, (b) frequency offset estimation, (c) timing tracking, and (d) frequency offset tracking.

9. The apparatus according to claim 1, further comprising a signal arrival detector circuit to detect arrival of the RF signals, wherein the timing correlator and frequency offset estimator circuit operates in response to the detection of the arrival of the RF signals.

10. An integrated circuit (IC), comprising:
    a radio frequency (RF) receiver, comprising:
       a Coordinate Rotation Digital Computer (Cordic) circuit to receive in-phase and quadrature signals derived from RF signals and to generate phase and amplitude signals;
       a signal arrival detector circuit to use the phase and amplitude signals to detect arrival of an RF signal and to provide a signal detect output signal; and
       a timing correlator and frequency offset estimator circuit coupled to receive a frequency signal derived from the phase signal to selectively perform at least one of: (a) initial timing detection, (b) frequency offset estimation, (c) timing tracking, and (d) frequency offset tracking.

11. The IC according to claim 10, further comprising:
    an initial frequency offset estimator circuit to provide an initial frequency offset estimate; and
    an adder circuit to add the initial frequency offset estimate to a frequency offset estimate from the timing correlator and frequency offset estimator circuit.

12. The IC according to claim 11, further comprising:
    a phase differentiator circuit to receive the phase signal and to provide a frequency signal;
    a memory circuit to receive and store the frequency signal and to provide the stored signal to the adder circuit in response to an address signal;
    a controller circuit to generate the address signal based on at least one of: (a) signal detect output signal, (b) timing correlator output of the timing correlator and frequency offset estimator circuit; and
    a Viterbi decoder circuit to provide decoded signals derived from adder output.

13. The IC according to claim 10, wherein the timing correlator and frequency offset estimator comprises:
    a shift register circuit having a plurality of register circuits to receive a frequency signal;
    a plurality of subtractor circuits to subtract a plurality of coefficients from corresponding signals from the plurality of register circuits of the shift register circuit to generate a plurality of difference signals; and
    a plurality of absolute value circuits to selectively provide as output signals either the plurality of difference signals or absolute values of plurality of difference signals.

14. The IC according to claim 13, wherein the timing correlator and frequency offset estimator circuit further comprises:
    an adder circuit to provide a sum of the output signals of the plurality of absolute value circuits; and
    a demultiplexer circuit to provide, in response to a control signal, either the sum of the output signals of the plurality of absolute value circuits or a divided value of the sum of the output signals of the plurality of absolute value circuits.

15. A method of receiving radio frequency (RF) signals, the method comprising:

receiving time domain signals derived from the RF signals in a Coordinate Rotation Digital Computer (Cordic) circuit and generating a phase signal;

using a timing correlator and frequency offset estimator to provide at least one of initial timing detection, frequency offset estimation, timing tracking, and frequency offset tracking using data derived from a frequency signal derived from the phase signal; and decoding, using a Viterbi decoder, data derived from the frequency signal.

16. The method according to claim 15, further comprising:

phase differentiating the phase signal and providing a frequency signal; and storing in a memory the data related to the frequency signal.

17. The method according to claim 16, further comprising adding data stored in the memory to a frequency offset estimate to generate a sum and providing the sum to the timing correlator and frequency offset estimator.

18. The method according to claim 17, wherein the frequency offset estimate comprises an initial frequency offset estimate provided by an initial frequency offset estimator, or a frequency offset estimate provided by the timing correlator and frequency offset estimator.

19. The method according to claim 15, further comprising using the feedback signal by the timing correlator and frequency offset estimator to perform a timing tracking operation or a frequency offset estimate operation to compensate for timing or frequency drift, respectively.

20. The method according to claim 19, wherein the feedback signal is derived from the decoded data provided by the Viterbi decoder.

* * * * *